(12) United States Patent
Willame et al.

(10) Patent No.: US 9,084,017 B2
(45) Date of Patent: Jul. 14, 2015

(54) RECEIVERS FOR TELEVISION SIGNALS

(75) Inventors: Xavier Willame, Twickenham (GB); Nigel Bodkin, Windsor (GB); Nicholas James, Wallington (GB); Ellen Fiona Collins, Twickenham (GB); Benjamin Johnathan Freeman, Ancastle Green (GB); Brian Francis Sullivan, Richmond (GB)

(73) Assignee: BRITISH SKY BROADCASTING LTD., Isleworth, Middlesex (GB)

( * ) Notice: Subject to any disclaimer, the term of this patent is extended or adjusted under 35 U.S.C. 154(b) by 0 days.

(21) Appl. No.: 13/309,790

(22) Filed: Dec. 2, 2011

(65) Prior Publication Data

US 2012/0076472 A1   Mar. 29, 2012

Related U.S. Application Data

(62) Division of application No. 10/495,546, filed as application No. PCT/GB02/05109 on Nov. 13, 2002.

(30) Foreign Application Priority Data

Nov. 13, 2001 (GB) .................................. 0127234.3

(51) Int. Cl.
*H04N 21/433*   (2011.01)
*H04N 21/458*   (2011.01)
*H04N 5/76*   (2006.01)
*H04N 21/472*   (2011.01)
*H04N 21/488*   (2011.01)
(Continued)

(52) U.S. Cl.
CPC ............. *H04N 21/4583* (2013.01); *H04N 5/76* (2013.01); *H04N 21/433* (2013.01); *H04N 21/4334* (2013.01); *H04N 21/47214* (2013.01); *H04N 21/4882* (2013.01); *H04N 5/765* (2013.01); *H04N 5/775* (2013.01); *H04N 5/781* (2013.01); *H04N 5/782* (2013.01); *H04N 9/8042* (2013.01)

(58) Field of Classification Search
None
See application file for complete search history.

(56) References Cited

U.S. PATENT DOCUMENTS 4,791,499 A   12/1988   Mester
5,187,589 A   2/1993   Kono et al.
(Continued)

FOREIGN PATENT DOCUMENTS

CN   1290452 A   4/2001
CN   1291843   4/2001
(Continued)

OTHER PUBLICATIONS

Examination Report from related New Zealand Patent Application No. 586170, dated Jan. 12, 2012, 1 page.
(Continued)

*Primary Examiner* — Cai Chen
(74) *Attorney, Agent, or Firm* — Rothwell, Figg, Ernst & Manbeck PC

(57) ABSTRACT

A television signals receiver for receives and stores television signals encoded at a variable data rate. Time information is generated based on the time of receipt of the signals that defines the duration of the television signals when output in decompressed form at a substantially constant data rate. The received signals are then written to a file on a hard disk 13 in received order together with the time information. The time information of signals stored in the file is monitored and old signals are deleted from the file such that the file stores signals corresponding to a predetermined period of time.

7 Claims, 9 Drawing Sheets

(51) Int. Cl.
*H04N 5/765* (2006.01)
*H04N 5/775* (2006.01)
*H04N 5/781* (2006.01)
*H04N 5/782* (2006.01)
*H04N 9/804* (2006.01)

(56) References Cited

U.S. PATENT DOCUMENTS

| | | |
|---|---|---|
| 5,187,859 A | 2/1993 | Heim |
| 5,278,673 A | 1/1994 | Scapa et al. |
| 5,325,402 A | 6/1994 | Ushirokawa |
| 5,371,551 A | 12/1994 | Logan et al. |
| 5,392,396 A | 2/1995 | MacInnis |
| 5,418,973 A | 5/1995 | Ellis et al. |
| 5,438,423 A | 8/1995 | Lynch et al. |
| 5,477,262 A | 12/1995 | Banker et al. |
| 5,758,257 A | 5/1998 | Herz et al. |
| 5,822,493 A | 10/1998 | Uehara et al. |
| 6,240,240 B1 | 5/2001 | Nagano et al. |
| 6,311,011 B1 | 10/2001 | Kuroda |
| 6,344,878 B1 | 2/2002 | Emura |
| 6,430,363 B2 * | 8/2002 | Sasaki et al. ............... 386/328 |
| 6,493,629 B1 | 12/2002 | Van Bosch |
| 6,701,528 B1 | 3/2004 | Arsenault et al. |
| 6,782,550 B1 | 8/2004 | Cao |
| 7,734,153 B1 | 6/2010 | Park |
| 2001/0033342 A1 | 10/2001 | Kim et al. |
| 2001/0051037 A1 * | 12/2001 | Safadi et al. ............... 386/83 |
| 2002/0037154 A1 | 3/2002 | Goto et al. |
| 2002/0174430 A1 | 11/2002 | Ellis et al. |
| 2002/0191954 A1 * | 12/2002 | Beach et al. ............... 386/46 |
| 2003/0149988 A1 | 8/2003 | Ellis et al. |
| 2003/0208771 A1 * | 11/2003 | Hensgen et al. ............... 725/100 |
| 2007/0191954 A1 * | 8/2007 | Hansell et al. ............... 623/17.15 |
| 2007/0230921 A1 | 10/2007 | Barton et al. |

FOREIGN PATENT DOCUMENTS

| | | |
|---|---|---|
| DE | 3534540 A1 | 4/1986 |
| DE | 3543540 A1 | 6/1987 |
| EP | 0212389 A1 | 3/1987 |
| EP | 0713334 A2 | 5/1996 |
| EP | 0762756 A2 | 3/1997 |
| EP | 0836320 A2 | 4/1998 |
| EP | 0961268 A2 | 12/1999 |
| EP | 1001622 A2 | 5/2000 |
| EP | 1058456 A1 | 12/2000 |
| EP | 1104189 A | 5/2001 |
| EP | 1104189 A2 * | 5/2001 |
| EP | 1113668 A1 | 7/2001 |
| EP | 1 185 095 A1 | 3/2002 |
| GB | 2017452 A | 10/1979 |
| JP | 6-5274 | 1/1994 |
| JP | 06-022273 A | 1/1994 |
| JP | 08-138318 A | 5/1996 |
| JP | 08-195031 A | 7/1996 |
| JP | 10-069300 A | 3/1998 |
| JP | 1998-79916 A | 3/1998 |
| JP | 10-234007 A | 9/1998 |
| JP | 11-259927 A | 9/1999 |
| JP | 2000-032399 A | 1/2000 |
| JP | 2000-184320 A | 6/2000 |
| JP | 2000175113 A | 6/2000 |
| JP | 2000-251406 A | 9/2000 |
| JP | 2000-270288 A | 9/2000 |
| JP | 2000354221 A | 12/2000 |
| JP | 2001-128076 A | 5/2001 |
| JP | 2001-136476 A | 5/2001 |
| JP | 2001-157152 A | 6/2001 |
| JP | 2001-169216 A | 6/2001 |
| JP | 2001-197382 A | 7/2001 |
| RU | 2146855 C1 | 3/2000 |
| WO | WO 9633579 A1 | 10/1996 |
| WO | WO 9637996 A1 | 11/1996 |
| WO | WO 9641470 A1 | 12/1996 |
| WO | WO 9723997 A1 | 7/1997 |
| WO | WO 97/28630 A2 | 8/1997 |
| WO | WO 99/04561 | 1/1999 |
| WO | WO 00/04706 A2 | 1/2000 |
| WO | WO 00/16548 A1 | 3/2000 |
| WO | WO 0059223 A1 | 10/2000 |
| WO | WO 01/06370 A1 | 1/2001 |
| WO | WO 01/11865 A1 | 2/2001 |
| WO | WO 01/13637 A1 | 2/2001 |
| WO | WO 01/47249 A2 | 6/2001 |
| WO | WO 01/82588 A2 | 11/2001 |
| WO | WO 0182606 A1 | 11/2001 |

OTHER PUBLICATIONS

Examination Report issued in Canadian Application No. 2,586,489, 3 pages (mailed Apr. 3, 2012).
European Patent Office Communication 94(3) EPC in corresponding European Patent Application No. 10184792.9, 7 pages (Mailed Apr. 18, 2012).
European Patent Office Communication 94(3) EPC in corresponding European Patent Application No. 06023519.9, 5 pages (Mailed Apr. 10, 2012).
STALLINGS, "File Allocation," Operating Systems: Internals and Design Principles, Prentice-Hall, Upper Saddle River, New Jersey, US, 520-527 (Jan. 1, 1998).
Final Notice of Grounds of Rejection (English translation only) in corresponding Japanese Patent Application No. 2009-183497, 4 pages (mailed May 29, 2012).
Office Action in corresponding Korean Patent Application No. 10-2011-7030817 (English translation only), 2 pages (mailed Apr. 9, 2012).
Office Action issued in corresponding Chinese Patent Application No. 200710086217.9 (with English translation), 7 pages (mailed May 8, 2012).
Second non-final Office Action in corresponding Korean Patent Application No. 2011-7006232 (with English translation of claims), 6 pages (mailed May 21, 2012).
Office Action issued in Chinese Patent Application No. 201010514395.9 (English translation only), 6 pages (dated Oct. 10, 2012).
Office Action issued in Chinese Patent Application No. 200710086217.9 (English translation only), 4 pages (dated Oct. 8, 2012).
Final Office Action issued in U.S. Appl. No. 10/495,546, 21 pages (dated Oct. 16, 2012).
Final Official Action in Mexican Patent Application No. MX/a/2010/000265, 4 pages (Oct. 17, 2011) and a redacted Olivares & CIA letter discussing contents of Mexican Office Action, 2 pages (Nov. 14, 2011).
First Office Action in Chinese Patent Application No. 201010514395.9 and English Translation, 13 pages (Oct. 14, 2011).
First Office Action in Japanese Patent Application No. 183497/2009 and English translation, 16 pages (Nov. 15, 2011).
Communication 94(3) EPC in European Patent Application No. 06023519.9, 5 pages, (Sep. 23, 2011).
Communication EPC 94(3) EPC in European Patent Application No. 10178083.1, 7 pages, (Sep. 15, 2011).
Communication EPC 62 EPC in European Patent Application No. 10184792.9, 8 pages, (Oct. 6, 2011).
Examination Report from related Australian Application No. 2008203112, 3 pages (dated May 26, 2010).
English translation of Chinese Office Action in related Chinese Application No. 200910138030.8, 6 pages (dated Mar. 26, 2010).
European Opposition from related European Application No. 02775000.9, 12 pages (dated Apr. 16, 2010).
English translation of Israeli Office Action in related Israeli Application No. 161967, 5 pages (dated Jun. 8, 2009).
Mexican Office Action in related Mexican Application No. MX/a/2007/005079, 4 pages (dated Aug. 21, 2009).
Mexican Office Action in related Mexican Application No. MX/a/2007/005079, 4 pages (dated Apr. 13, 2010).

(56) References Cited

OTHER PUBLICATIONS

Examination Report from related New Zealand Application No. 586170, 2 pages (dated Jun. 16, 2010).
EPO Communication 94(3) EPC in corresponding European Patent Application No. 10180318.7, 5 pages (mailed Jul. 29, 2011).
Office Action in corresponding Canadian Patent Application No. 2,586,489, 3 pages (mailed Aug. 31, 2011).
English translation of Korean Office Action in related Korean Application No. 10-2011-7006232, 3 pages (mailed Jun. 23, 2011).
English translation of Chinese Office Action from related Application No. 200710086217.9, 10 pages (dated Sep. 13, 2010).
English translation of Korean Office Action in related Korean Application No. 10-2010-7013214, 5 pages (dated Sep. 17, 2010).
European Search Report from related Application No. 10180318.7, 6 pages (dated Nov. 8, 2010).
European Search Report from related Application No. 10178083.1, 9 pages (dated Nov. 9, 2010).
Decision Rejecting the Opposition in related European Application No. 02775000.9, 15 pages (dated Dec. 27, 2010).
English translation of Russian Office Action in related Russian Application No. 2004117876/09(019291), 2 pages (mailed Apr. 27, 2009).
English translation of Japanese Office Action for corresponding Japanese Application No. 545021/2003, 7 pages (Office Action dated Aug. 26, 2008).
Australian Office Action dated Jul. 23, 2008, Ref. No. 42640AUP00, Patent Application No. 2002341214, 1 page.
Australian Office Action dated Aug. 18, 2008, Ref. No. 42640AUP00, Patent Application No. 2002341214, 2 pages.
UK Search Report dated Jul. 22, 2002, Ref. No. J00043898GB, Application No. GB 0127234.3, 3 pages.
Colombia Exam Report dated Jul. 6, 2007, Application No. 04054260 of Jun. 9, 2004, 8 pages.
European Search Report dated Oct. 11, 2007, Application No. 06023519.1-1241, 6 pages.
First Russian Office Action, Application No. 2004117876/09(019291), 12 pages.
New Zealand Examination Report dated Jun. 28, 2004, Patent Application No. 533362, 2 pages.
Second Russian Office Action, Application No. 2004117876/09(019291) 11 pages.
Letter from associate with Indonesian Exam Report dated May 18, 2006 attached, Indonesian Patent Application No. W-00200401237, 3 pages.
Examination Report, New Zealand Application No. 597099 dated Dec. 15, 2011, 2 pages.
English translation of Korean Office Action in related Korean Application No. 10-2009-7019386, 10 pages (dated Dec. 15, 2009).
EPO Communication 94(3) EPC issued in European Patent Application No. 101780831, 4 pages (dated Feb. 13, 2013).
Non-final Office Action issued in U.S. Appl. No. 13/309,784, 21 pages (dated Mar. 21, 2013).
Office Action issued in Japanese Patent Application No. 2012-093246, 3 pages (mailed Jun. 28, 2013).
Non-final Office Action issued in U.S. Appl. No. 10/495,546, 21 pages (mailed Aug. 12, 2013).
Non-final Office Action issued in U.S. Appl. No. 13/617,099, 20 pages (Aug. 27, 2013).
English Translation of Office Action issued in Japanese Patent Application No. 2012-093246, 4 pages (mailed Jun. 28, 2013).
English translation of Decision on Grant in Russian Patent Application No. 2004117876/09(019291), 7 pages.
Examiner's Report issued in Australian Patent Application No. 2012227175, 3 pages (Nov. 20, 2013).
Examiner's Report issued in Australian Patent Application No. 2012227177, 3 pages (Nov. 20, 2013).
Examination Report in co-pending Australian Patent Application No. 2012201035, 2 pages (Oct. 29, 2013).
Office Action issued in Mexican Patent Application No. 56614, 4 pages (Aug. 22, 2013).
Final Office Action issued in U.S. Appl. No. 13/309,784, 16 pages (Nov. 20, 2013).
Non-final Office Action issued in U.S. Appl. No. 13/617,099, 18 pages (Jan. 17, 2014).
Office Action issued in Canadian Patent Application No. 2,861,593, 3 pages (Feb. 13, 2015).
Office Action issued in Canadian Patent Application No. 2,861,589, 4 pages (Feb. 13, 2015).
Final Office Action issued in U.S. Appl. No. 10/495,546, 24 pages (Mar. 20, 2014).
Office Action issued in Japanese Patent Application No. 2012-093246, 2 pages (Jan. 28, 2014).
Office Action issued in Canadian Patent Application No. 2,586,489, 5 pages (Feb. 26, 2014).
English translation of Office Action in Japanese Patent Application No. 2012-093246, 3 pages (Jan. 28, 2014).
Office Action issued in Chinese Patent Application No. 201210161674.0, 22 pages (Mar. 17, 2014).
Office Action issued in Mexican Patent Application No. MX/a/2012/002430, 3 pages (Feb. 21, 2014).
Office Action issued in Israeli Patent Application No. 220193 with English translation, 4 pages (Jun. 23, 2014).
Office Action issued in Israeli Patent Application No. 220197, 4 pages (Jul. 2, 2014).
Non-final Office Action issued in U.S. Appl. No. 10/495,546, 18 pages (Sep. 29, 2014).
Office Action issued in Israeli Patent Application No. 220196, 4 pages (Jun. 30, 2014).
English translation of Office Action issued in Russian Patent Application No. 2010106007/07(008542), 5 pages (Aug. 13, 2014).
English translation of Office Action issued in Chinese Patent Application No. 201210161674.0, 7 pages (Oct. 8, 2014).
Final Decision for Rejection issued in Japanese Patent Application No. 2012-093246 and English translation, 6 pages (Sep. 24, 2014).
Final Office Action issued in U.S. Appl. No. 13/617,099, 18 pages (Nov. 18, 2014).
Final Office Action issued in U.S. Appl. No. 13/309,784, 21 pages (Nov. 20, 2014).
Office Action issued in Australian Patent Application No. 2012227175, 3 pages (Nov. 21, 2014).
Notice of Allowance issued in U.S. Appl. No. 13/309,784, 19 pages (Jun. 4, 2015).
Office Action issued in Russian Patent Application No. 2010106007 with English translation, 6 pages (Apr. 6, 2015).
Final Office Action issued in U.S. Appl. No. 13/617,099, 15 pages (Apr. 22, 2015).
Notice of Allowance issued in U.S. Appl. No. 10/495,546, 17 pages (Apr. 20, 2015).
US 5,825,354, 10/1998, Ahmad et al. (withdrawn)

* cited by examiner

RECEIVERS FOR TELEVISION SIGNALS

CROSS-REFERENCE TO RELATED APPLICATIONS

The present application is a divisional application under 35 USC §121 which claims priority under 35 USC §120 to U.S. application Ser. No. 10/495,546, filed on 7 Dec. 2004, which is a national stage filing under 35 USC §371 of International Application Serial No. PCT/GB02/05109, filed on 13 Nov. 2002. The present application is also related to and claims priority under 35 USC §119(e) to Great Britain patent application Serial No. 0127234.3 filed on 13 Nov. 2001. Each application is incorporated herein by reference.

FIELD OF THE INVENTION

This invention relates to methods and apparatus for recording television signals for subsequent playback and, more specifically, to improvements in the storage of data representing television signals and such like and improvements in the control of recording and playback.

BACKGROUND OF THE INVENTION

In recent years there has been a move towards broadcasting television signals in digital form. Suitable receivers/recorders (also known as 'set top boxes', but generally referred to herein as 'receivers') have been developed to take advantage of the digital format to allow the viewer, among other things, to record one television programme while watching another. An example of such a receiver is described in our International patent application published as WO-A-01/11865, the teachings of which are incorporated in this document by reference.

The receiver described in that International patent application is arranged to receive signals representing television programmes and television programme schedule data and has a recorder comprising a "hard disk" for recording received television programmes. The receiver constantly receives updated programme schedule data in a dedicated programme schedule data channel and is arranged to output the programme schedule data for display on a television screen. A user can use the displayed programme schedule data to select programmes for recordal.

The receiver is also arranged to receive additional programme schedule information included in each received television channel, which information is used to control the hard disk to record user-selected pre-programmed television programmes. The hard disk is operable to record simultaneously two different television programmes received in different channels. Also, the receiver is operable to replay a currently broadcast programme offset in time. The time offset can be overcome by playing back the part of the programme inside the time offset at an increased frame rate. Furthermore, the receiver is arranged to receive transition signals indicating transitions between parts of programmes. Transitions might be between different items in a magazine format programme, for example a sports magazine programme or music video programme. The recorder is operable to use these transition signals, for example, to skip between parts of recorded programmes replayed from the hard disk.

Some receivers include a facility for recording a programme while it is being viewed to enable "instant" playback of a portion of the programme while it is still being broadcast. Instant playback recording might begin automatically when the viewer first switches to a channel and might continue until such time as the viewer switches from the channel or until an allotted memory space is full up. Recording can be automatic as it can be done without any intervention by the viewer.

Instant playback recording may be implemented by recording a programme as data in a so-called cyclic file, such as described in EP1185095. A cyclic file is generally a data file of fixed size, e.g. a certain number of bytes such as 2 gigabytes. Data may be recorded in a cyclic file as it is received until the file is full of data. At that point the recording continues from the beginning of the file, writing over the data previously recorded in the file. Thus, the cyclic file always contains the most recent viewed portion of a programme as far as the size of the cyclic file allows.

The size of a cyclic file used by a receiver is typically selected such that it can store a length of program likely to be useful to a viewer whilst bearing cost considerations in mind. As memory costs have fallen and sizes of, for example, hard disk memories have increased, the amount of time that can be recorded in cyclic files has increased. At present, a cyclic file may typically be expected to store received video data of approximately 30 minutes to one hour in length, thus giving the viewer the option of instant playback of any portion of a programme from up to one hour previously.

Compression techniques are used to compress digital television data before it is transmitted. A frame of video showing, say, a crowd scene is generally much more complex than a frame of video showing, say, a commentator in front of a plain background and thus will be more difficult to compress without introducing unwanted artefacts. Similarly, video including significant changes between frames, such as video of fast moving scenes, is generally more complex than slower changing video. Less compression can therefore be applied to some video, such as the crowd scene, than to other video, such as the commentator, in order to maintain the same level of perceived quality. To try to maintain the same level of perceived quality, but at the same time compress the video data as much as possible, the rate at which video data is transmitted can therefore be varied depending on content. This is known as Variable Bit Rate (VBR) encoding. For example, during transmission of the crowd scene a data rate of 6 megabits per second may be used, while during transmission of the commentator, only 3 megabits per second may be used. It is therefore not possible to know in advance how much disk space will be required to store data for 30 minutes (say) of a programme when VBR encoding is used.

Furthermore, it is common for broadcasters to vary the bandwidth allocated to a channel in order to accommodate demands on their networks. For example, a particular uplink to a satellite of a satellite network may have a fixed bandwidth, i.e. data rate, of (say) 20 megabits per second available to transmit data to a given satellite. This bandwidth may be divided between the channels broadcast via the satellite, generally such that the full available bandwidth is exploited, i.e. such that there is little or no spare bandwidth. However, the bandwidth required by each channel may vary from time to time. Furthermore, the number of channels to be transmitted on the uplink may change from time to time, e.g. during the course of a day. The bandwidth allocated to a channel and hence the data rate at which particular programmes are received at a receiver may therefore vary. Again, it is therefore very difficult to determine, in advance, the size of a cyclic file that will be required to store 30 minutes (say) of a given programme.

To ensure that a user always has at least 30 minutes (say) of content on the disk, cyclic files have therefore been made as large as may be necessary to cover the worst case, e.g. to make the file large enough to store 30 minutes (say) of video data transmitted with the lowest compression, i.e. at the highest data rate. This is wasteful of disk space. Having to dedicate memory for the greatest possible memory requirement for the cyclic file also limits the user's choice. It may also be unpredictable for a user, as the user is not certain whether the cyclic file contains 30 minutes (say) of a programme, more or less.

SUMMARY OF THE INVENTION

According to the present invention, there is therefore provided a method of storing data comprising: receiving data at a variable data rate that represents an information stream; storing the data; determining the expected duration of the information stream represented by the stored data should the information stream be reproduced as intended; and deleting the oldest stored data when the determined duration reaches a given period such that the determined duration does not exceed the given period.

Also according to the present invention there is provided an apparatus for storing data comprising: a receiver for receiving data at a variable data rate that represents an information stream; a storage device for storing the data; and a processor for determining the expected duration of the information stream represented by the stored data should the information stream be reproduced as intended; wherein the storage device deletes the oldest stored data when the determined duration is greater than a given period such the determined duration does not exceed the given period.

Thus, the amount of stored data is determined by the duration of the information the data represents, e.g. by the length of stored video or stored television signals when viewed as normal. This has the advantage of being able to provide a buffer, e.g. for a television signal, that has a maximum capacity defined by the duration of the information it is intended to contain, e.g. a television programme of say 30 minutes, rather than the amount of data that can be stored in the buffer, e.g. 2 gigabytes. This is far more predictable for a user as the user can be more certain of the length of the stored information stream. Provided enough data has been received and stored to reach the given period, the storage device, memory or buffer will always store data representing substantially the given period of the information stream.

The information stream is typically a continuous signal intended to be reproduced at a known or predictable rate. For example, the information stream may be a video steam or an audio stream, such as a television or radio signal. In particular it may be a satellite television broadcast using, for example, the Digital Video Broadcast/Moving Picture Experts Group 2 (DVB/MPEG 2) standard. Television signals are normally reproduced at a known number of frames per second. In particular, the information stream may therefore be intended to be reproduced at a substantially constant rate, e.g. a constant frame rate.

The expected duration of the stream of information represented by the data can be determined in a variety of ways. For example, the data may contain headers or markers providing timing information for reproduction of the information that can be read to determine the expected duration. The so-called "I-frames" of the MPEG standard may be produced at known intervals and therefore provide such markers. Alternatively, knowledge of the amount of data received, along with it's compression rate where appropriate, may be used to determine expected duration. However, it is particularly preferred that the expected duration of the stream of information represented by the data is determined as the length of the period during which the stored data was received. This exploits the knowledge that for certain signals, such as DVB/MPEG 2 broadcasts, data representing information to be displayed in a particular time period is transmitted over a time period of the substantially same length (although the amount of data in respective periods may vary, e.g. according to the amount of compression applied). In other words, for certain signals, the data received in a one second interval relates to information to be reproduced in a one second interval so that logging the time it takes to receive the data logs the expected duration of the information stream when it is reproduced as intended. The preferred method is particularly straightforward and convenient as it requires minimum processing to implement.

The given period is typically a default period, for example stored in software used to implement the method or apparatus. However, it is beneficial for a user to be able to vary the given period. This may allow a user to choose how memory resources are allocated. The apparatus might therefore comprise means, such as a controller, by which the user may vary the given period. Typically, the given period might have a default of 30 minutes and be varied by the user to one of 0 minutes (i.e. turned off), 5 minutes, 15 minutes, 30 minutes or 1 hour, or any other convenient period subject to the maximum memory space available.

The storage device may be any of a variety of suitable memory units, such as computer RAM (Random Access Memory), CD-RW (Compact Disc-Re-Writable) drive, DVD-RW (Digital Video/Versatile Disc Re-Writable) drive or Flash memory. However, it is particularly preferred that the storage device is a hard disk drive, such as a conventional computer hard disk. Hard disks have large capacity, are robust and have fast read and write rates. They are therefore suited to this invention, particularly when video data is stored, which has a relatively high data rate.

Typically, the received data is therefore stored in a file in a memory. In other words, the storage device stores the data as a file in a memory. The remainder of the memory may be used by other applications or to store other data. To facilitate this, the size of the file may be dynamically adapted to equal the amount of stored data. Whilst the duration of the stream of information represented by the stored data may remain substantially constant, the size of the file in which the data is stored varies according to the amount of stored data, which in turn depends on the rate at which data is received.

As it was always necessary for the cyclic files of the prior art to be large enough to cover the worst case, i.e. to store (say) 30 minutes of data received at the maximum data rate, these cyclic files took up a large amount of memory space. However, memory space can be allocated to the stored data of the invention dynamically, as the amount of stored data is monitored according to the duration of the information it represents. Thus, during periods of low received data rate, the file in which the data is stored can be smaller than during periods of high received data rate. Memory space can therefore be allocated to the file and to other applications or other stored data more efficiently. In other words, the need in the prior art to reserve memory space which is surplus to requirements during periods of low received data rate is obviated by the invention.

Other applications or stored data might include recordal of entire programmes, or a particular broadcast, between fixed start and end times as facilitated by Personal Video Recorders (PVRs) and such like. Data files for such recordings may be regarded as 'linear' in that there is not usually any deletion of the start of the file that limits the size of the file, such as the prior art cycling back to overwrite earlier data with new data. Rather, linear files are usually of indeterminate length.

An example of how broadcast data is processed for storage in linear files on a hard disk is described in International patent application published as WO-A-01/35669. Broadcast data is transmitted in scrambled form to protect the content from unauthorised viewing. The published patent document describes an apparatus and method for processing scrambled data streams, in which the scrambled data is recorded in its scrambled state and is only descrambled at the time of playback.

When a receiver provides instant playback recording of received television programmes as discussed above, it may be desirable to allow a user to save the instant playback recording. A user can then, for example, choose to save an entire programme after it has started by saving the instant playback recording along with the remainder of the programme. However, recordings of entire programmes are usually made in linear files and the instant playback recording is usually made in a cyclic file. The cyclic files and the linear files of the prior art are incompatible with one another. It is not therefore a simple task to convert between a cyclic file structure and a linear file structure. For example, when a cyclic file is stored on a hard disk, a given space on the hard disk, of the predetermined size, is generally permanently allocated to the cyclic file. This can reduce choice and usability for the user by committing memory space that could be allocated to other uses. Furthermore, if, at some stage, it is desirable to store in a linear file the data stored in such a cyclic file, it is necessary to copy the data from the cyclic file into a new linear file. This operation is generally inefficient, for example, in use of processing and memory resources, and undesirable.

A preferred feature of the invention is therefore that the data is stored as a data file and that the oldest stored data is deleted by moving the start of the data file to data representing information later in the stream of information. The data can then be stored in effectively the same way as data is stored in a linear file, except that the start of the file can be moved to delete the earliest or oldest data from the file and limit the size of the file. Should it be desired to convert the file to a linear file, movement of the start of the file is simply stopped. This is clearly more efficient than the prior art.

The applicants consider this to be new in itself and, according to another aspect of the present invention there is therefore provided a method of storing data, comprising storing a data stream as a data file in a memory such that it does not exceed a specified size by deleting the oldest data from the data file whilst storing new data at the end of the data file, wherein the oldest data is deleted by moving the start of the data file to later in the stored data stream.

According to another aspect of the present invention there is provided an apparatus for storing data, comprising means for storing a data stream as a data file in a memory and a file manager for ensuring that the data file does not exceed a specified size by deleting the oldest data from the data file whilst new data is stored at the end of the data file, wherein the file manager deletes the oldest data by moving the start of the data file to later in the file.

Unlike the prior art, the oldest data is not simply overwritten. Rather new data is added to the end of the data file as if it were a linear file. The start of the data file is redefined to maintain the size of the file and as the start of the file is moved, the memory used by the oldest data is returned to the memory for general use. Thus, at any particular time, the data file actually resembles a linear file, and can therefore be converted to such simply by stopping the deletion process. Thus, conversion of the file from a "buffer" to a linear file is straightforward.

As mentioned above, the memory is typically a hard disk or such like. More generally, the memory may therefore be formatted as plural storage sectors and the data file may occupy a series of the storage sectors. The start of the data file may be identified as at a particular storage sector. The start of the data file may be moved by identifying another particular storage sector later in the series of storage sectors such that the preceding storage sectors in the series are removed from the data file. This implementation is particularly convenient.

Overall, according to another aspect of the invention there is provided a method of storing data, the method comprising: receiving data in a data stream comprising compressed video data delivered at a variable data rate; generating time information based on the time of receipt of the data and relating to the duration of the data when output in decompressed form at a substantially constant data rate; writing the received data to a file in a store in received order together with the time information; monitoring the time information of data written to the file; and deleting data from the file when the total amount of data in the file corresponds to a period of time greater than a predetermined period so that at any instant in time the amount of data in the file is of a duration equal to or not substantially greater than the predetermined period.

According to another aspect of the present invention, there is provided an apparatus for storing data, the apparatus comprising: means for receiving data in a data stream comprising compressed video data delivered at a variable data rate; means for generating time information based on the time of receipt of the data and relating to the duration of the data when output in decompressed form at a substantially constant data rate; means for writing the received data to a file in a store in received order together with the time information; means for monitoring the time information written to the file; and means for deleting data from the file when the total amount of data in the file corresponds to a period of time greater than a predetermined period so that at any instant in time the amount of data in the file is of a duration equal to or not substantially greater than the predetermined period.

According to another aspect of the invention there is provided a method of recording data representing programmes for subsequent playback of the programmes, the method comprising: storing one set of received data for one programme in a store while simultaneously outputting the same data for display of the programme represented thereby, the one set of received data being stored in accordance with the above method; and recording another set of received data for another programme in the store.

The invention also provides an apparatus for recording data representing programmes for subsequent playback of the programmes, the apparatus comprising: means for storing one set of received data for one programme in a store while simultaneously outputting the same data for display of the programme represented thereby, the one set of received data being stored by the above apparatus; and means for recording another set of received data for another programme in the store.

The invention also provides a method of recording television programmes, the method comprising storing times that programmes are to be recorded and revising the stored times if there is a overlap in the time that two or more programmes are to be recorded to give priority to the programme having programme type with higher priority on a stored programme type priority list.

The invention also provides an apparatus for recording television programmes, the apparatus comprising means for storing times that programmes are to be recorded and means for revising the stored times if there is a overlap in the time that two or more programmes are to be recorded to give priority to the programme having programme type with higher priority on a stored programme type priority list.

The invention also provides a method of making recordings of plural programmes, the method comprising: generating a priority list identifying types of programmes to be recorded and their relative priorities; storing timing information relating to one or more programmes to be recorded together with information identifying the type of programme to be recorded; comparing entries on the priority list with the stored timing and type information for each programme to be recorded; and revising the stored timing information in the event of a conflict between timing information for two or more programmes to be recorded, depending on the relative priorities of the conflicting programmes.

The invention also provides an apparatus for making recordings of plural programmes, the apparatus comprising: means for generating a priority list identifying types of programmes to be recorded and their relative priorities; means for storing timing information relating to one or more programmes to be recorded together with information identifying the type of programme to be recorded; means for comparing entries on the priority list with the stored timing and type information for each programme to be recorded; and means for revising the stored timing information in the event of a conflict between timing information for two or more programmes to be recorded, depending on the relative priorities of the conflicting programmes.

The invention further provides a method of controlling a recorder to record programmes, the method comprising: storing a priority list identifying types of programmes to be recorded and their relative priorities; storing timing information relating to one or more programmes to be recorded together with information identifying the type of programme to be recorded; receiving a data stream including data representing programme content, programme identity data and data identifying the broadcast times of programmes; comparing the stored timing information with the received data identifying the broadcast times of programmes; adjusting the stored timing information in the event of a change as determined from the received data identifying the broadcast times of programmes; comparing entries on the priority list with the stored timing and type information for each programme to be recorded; and revising the stored timing information in the event of a conflict between timing information for two or more programmes to be recorded, depending on the relative priorities of the conflicting programmes.

The invention further provides an apparatus for controlling a recorder to record programmes, the apparatus comprising: means for storing a priority list identifying types of programmes to be recorded and their relative priorities; means for storing timing information relating to one or more programmes to be recorded together with information identifying the type of programme to be recorded; means for receiving a data stream including data representing programme content, programme identity data and data identifying the broadcast times of programmes; means for comparing the stored timing information with the received data identifying the broadcast times of programmes; means for adjusting the stored timing information in the event of a change as determined from the received data identifying the broadcast times of programmes; means for comparing entries on the priority list with the stored timing and type information for each programme to be recorded; and means for revising the stored timing information in the event of a conflict between timing information for two or more programmes to be recorded, depending on the relative priorities of the conflicting programmes.

BRIEF DESCRIPTION OF THE FIGURES

Examples of the invention are now described with reference to the accompanying drawings, in which.

DETAILED DESCRIPTION

Figure 1:
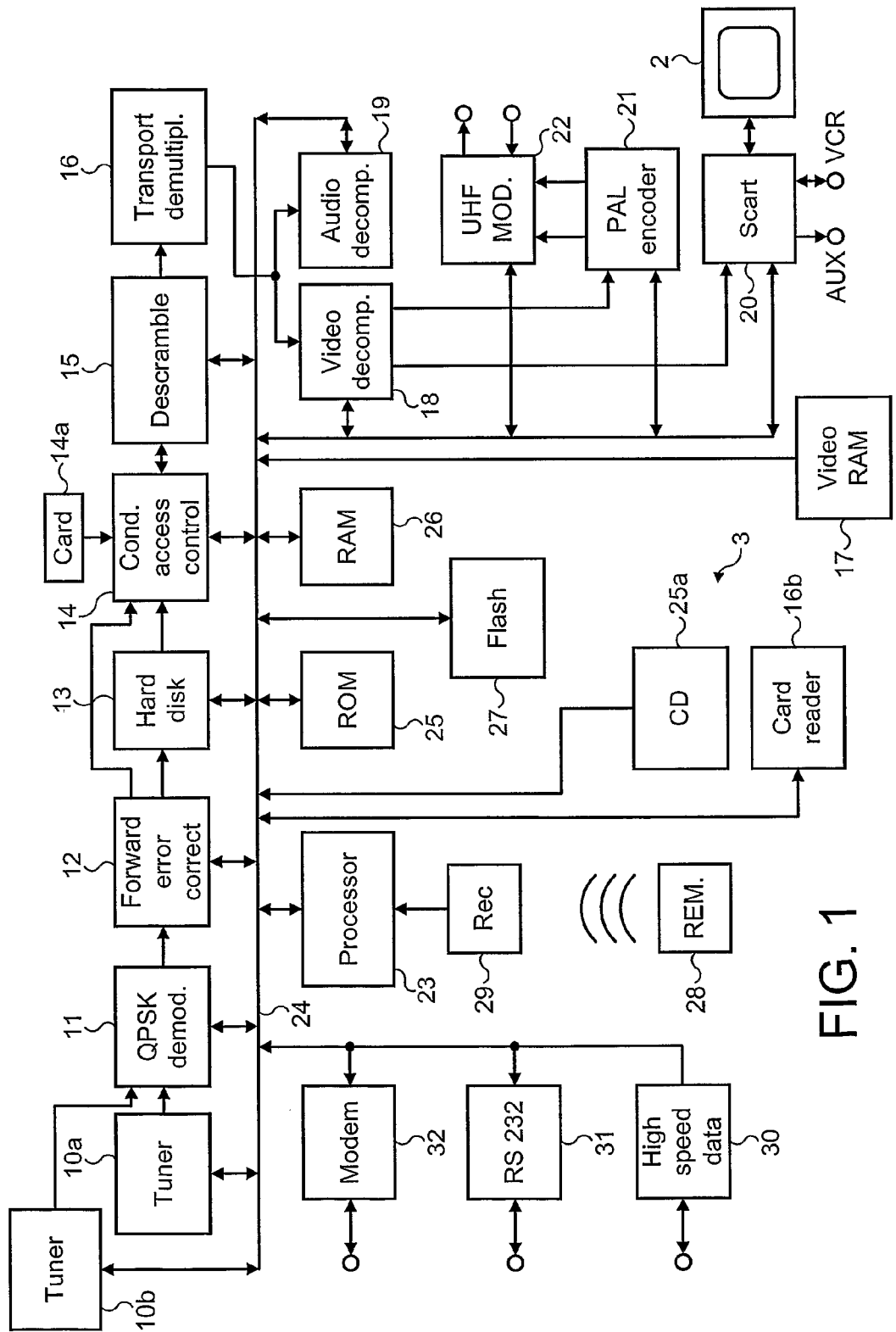
FIG. 1 is a schematic functional block diagram of a television receiver.

FIG. 1 of the accompanying drawings shows a "set top box" or receiver 3 for receiving television signals from a satellite television broadcast network. In this example, received signals are input to first and second tuners 10a and 10b but any plural number of tuners may be used in the receiver 3. The tuners 10a and 10b are tuneable into the same or different channels of the satellite television broadcast network for simultaneous reception of the same or different television programmes. Signals from the first and second tuners 10a and 10b are passed to a Quadrature Phase Shift Key (QPSK) demodulator 11. Demodulated signals are error-corrected by way of a forward error corrector circuit 12. The receiver 3 has a hard disk 13 which receives from the forward error corrector circuit 12 compressed video and audio data representing received television programmes for recording and subsequent playback, as described in greater detail below.

The received signals comprise digitally encoded data. In this example, the data is compressed using the Digital Video Broadcast/Moving Pictures Expert Group 2 (DVB/MPEG 2) standard which permits both programme data and additional data (for example interactive service data) to be transmitted in a single channel. DVB/MPEG 2 enables high compression ratios to be achieved. The hard disk 13 receives and stores compressed data. The data is decompressed only after retrieval from the hard disk 13.

Satellite (and indeed cable) programmes are usually scrambled to prevent unauthorised access by non-authorised subscribers. The receiver 3 therefore has a conditional access control circuit 14 which co-operates with a smart card 14a to determine whether the viewer has subscribed to a particular channel and is therefore authorised to access the channel. Parental control over channel access is also provided, at least in part, by the access control circuit 14. The receiver 3 further comprises a descrambling circuit 15 which is controlled by the access control circuit 14 to enable the descrambling of the signal by authorised subscribers.

Descrambled data is supplied to a transport/demultiplexer 16 which separates the data into video data, audio data, user services data, programme scheduling data, etc. for distribution to various locations within the receiver 3. The receiver 3 also comprises a video decompression and processing circuit 18 utilizing a dedicated video Random Access Memory (RAM) 17, and an audio decompression and processing circuit 19, operating according to the MPEG 2 standard, for example. The video and audio decompression and processing circuits 18 and 19 receive demultiplexed signals directly from the transport/demultiplexer 16, or from the hard disk 13. Decompressed video signals are input to a Syndicat des Constructions d'Appareits Radiorécepteurs et Télévision (SCART) interface 20 for direct input to the television (TV) 2 and to a Phase Alternation Line (PAL) encoder 21 where they are encoded into the PAL format for modulation by a Ultra High Frequency (UHF) modulator 22 for output to the UHF input of the TV 2 if so desired.

The receiver 3 is controlled by a processor 23 which communicates with the various units of the receiver via a bus 24. The processor 23 has associated with it Read Only Memory (ROM) 25 (optionally including a Compact Disc-Read Only Memory (CD-ROM) drive 25a), Random Access Memory (RAM 26) and a flash (non-volatile and writable) memory 27.

The processor 23 controls operation of the receiver 3 by tuning the tuners 10a and 10b to receive signals for the desired channels by controlling the demultiplexing, descrambling and decompression so that the desired programme and/or interactive service data is displayed on the screen of the TV 2, and by controlling the hard disk 13 to record desired television programmes or to play back previously recorded television programmes. Viewer selection of desired programmes and customer services is controlled by viewer manipulation of a remote control unit 28, which in response to such viewer manipulation transmits control signals to a receiver 29 for input to the processor 23. The remote control unit 28 also allows the viewer to control of the operation of the hard disk 13 to record television programmes, to play back recorded television programmes and to program the recording of television programmes, etc.

The receiver 3 further comprises a high-speed data interface 30 and a Recommended Standard 232 (RS232) interface 31 providing a serial link. The high-speed data interface 30 and the RS232 interface 31 may be connected to a Personal Computer (PC) and/or a games console and/or other digital equipment (not shown). The high speed data interface 30 enables the receiver 3 to be connected to other devices (not shown), for example to enable reception of services transmitted via other media such as broadband cable, external storage media or digital terrestrial broadcast. The receiver 3 further comprises a modem interface 32 for connecting a telephone network.

Operation of the receiver 3 is controlled by software that makes the processor 23 responsive to control signals from the remote control unit 28, additional data in the received signals and/or data stored in the memory units 25 to 27. Interaction between hardware and software in the receiver 3 is described in detail in our international patent application published as WO-A-01/11865. Operation of the receiver 3 in receiving and decoding data representing television programmes and data defining scheduling and other information related to the programmes is described in detail in our international patent application published as WO 96/37996. Operation of the receiver 3 in providing interactive services is described in our international patent application published as WO 97/23997.

Within the Digital Video Broadcasting (DVB) standard for digital television broadcast there exists a standard for the transmission of schedule information such that it can be decoded and presented correctly to subscribers in the form of an Electronic Programme Guide (EPG). This DVB standard is known generally as the SI standard and can be found in the specification: ETS 300 468, ETSI Digital Broadcasting Systems for Television, Sound and Data Services; Specification for Service Information (SI) in Digital Video Broadcasting (DVB) Systems 2nd edition. Guidelines for using the specification are given in ETSI ETR 211-DVB SI Guidelines. The receiver 3 is designed to support the SI specification.

In addition to operating data for use in controlling access to channels, additional data in a channel can include brief programme schedule data representative of so-called event information tables (EITs) defining the scheduling of programmes in each channel. The programme schedule data is used by the receiver 3 to control the operation of the hard disk 13. When the receiver 3 is programmed to record a selected television programme, the receiver 3 operates the hard disk 13 to start and to stop the recording in accordance with the programme schedule data which comprises the start and the end time of the selected television programme. Since the programme schedule data is updated regularly, the recording is started and stopped in accordance with the updated programme schedule, thus guaranteeing that a selected television programme is actually recorded even in case of a change of programme schedule, because such change is reflected in the programme schedule data in each channel.

The programme schedule data may be stored in the RAM 26 and, once stored, the scheduling information is available effectively instantaneously for controlling the operation of the hard disk 13. As discussed above, the programme schedule data is transmitted regularly so that the receiver 3 will be updated substantially continuously. The information is brief to enable each channel to carry the programme schedule data without excessive overheads in terms of bandwidth requirements in each channel and memory requirements in the receiver.

In addition, a dedicated EPG channel transmits more detailed programme scheduling information. The information transmitted via this dedicated channel is updated more frequently and covers a longer period of time (e.g. one week). As a consequence, an up-to-date television programme schedule of a complete week will always be available. As explained in greater detail below, the receiver 3 is arranged to display the programme scheduling information on the TV 2. Also, a viewer can interact with the receiver 3 to program recordings of television programmes, view a desired part of the available programme schedule, etc., on the basis of the information received via the dedicated EPG channel.

Accordingly, while the programme schedule data in each channel is used by the receiver 3 to operate the hard disk 13 to record a selected television programme in a selected channel at the correct up-to-date time, the programme scheduling information in the dedicated EPG channel is used to display the programme schedule for several of the channels over a predetermined period of time (which in turn is used for programming the receiver 3 as described below).

Since the tuners 10a and 10b can be tuned to receive different channels, it is possible for a first television programme in one channel to be displayed on a TV and recorded on the hard disk 13, while at the same time a second television programme in another channel is also recorded on the hard disk 13.

The hard disk 13 of the receiver 3 is similar to conventional hard disks used in computer systems for storing large amounts of data. The hard disk 13 has a capacity of many gigabytes (e.g. 40 gigabytes) and receives video and audio data for storage in the compressed form in which it is received, for example, in accordance with the DVB/MPEG 2 standards as discussed above. This allows for the storage of several hours of television programmes (e.g. 20+ hours) on the hard disk 13. The hard disk 13 comprises two storage areas, one for the storage of television programme data, and the other for storing "metadata" which is used to control the hard disk 13, as discussed in greater detail in our earlier patent publications mentioned above. The processor 23 controls the operation of the hard disk 13. More-specifically, the processor 23 controls the recording and playback of television programmes to and from the hard disk 13. Other processors (not shown) can be used to control the hard disk 13 as appropriate, but the control is described in this document with reference to only processor 23 to facilitate understanding.

Figure 2:
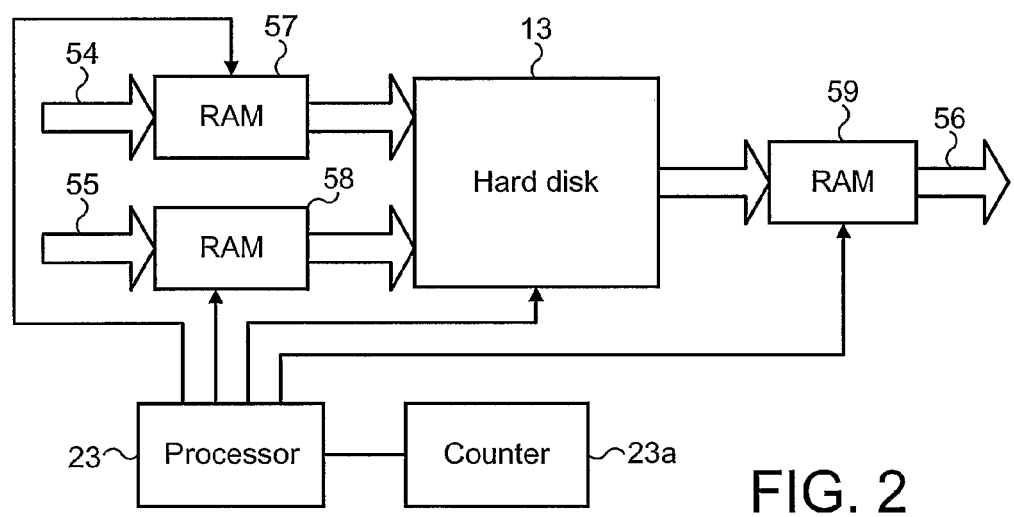
FIG. 2 is a schematic functional block diagram of a hard disk of the television receiver of FIG. 1.

Referring to FIG. 2, a schematic block diagram of the arrangement of the hard disk 13 is shown. In this example, the hard disk 13 has three data channels, through two of which data is received for storage on the hard disk 13 and through one of which data is output for subsequent displaying of television pictures. The three data channels consist of two data input channels 54 and 55 and one data output channel 56. Each of the data channels has associated with it a data buffer 57, 58 and 59, respectively. Each of the data buffers 57, 58 and 59 comprises a RAM of sufficient size to store several seconds of data (e.g. 8 megabytes). The operation of the data buffers 57, 58 and 59, as well as that of the hard disk 13, is controlled by the processor 23.

The hard disk 13 is operable to manage simultaneous reception of data through the data channels 54 and 55 and output of data through the data channel 56. Data received through the data channels 54 and 55 is not stored directly on the hard disk 13 as it is received but is buffered by the buffers 57 and 58, respectively. Likewise, data to be output through the data channel 56 is not output directly as it is read from the hard disk 13 but is buffered in the buffer 59.

The hard disk 13 is capable of managing a data rate that is higher than the rate at which data can be transferred through at least two of the three channels 54, 55 and 56. Indeed, in this example, the hard disk 13 is capable of managing a data rate at least as high as the rate of data transmitted through all three channels 54, 55 and 56 combined.

The hard disk 13 is therefore capable of simultaneously storing data received through both the input channels 54 and 55 and outputting data through the output channel 56. This is achieved by buffering the received data and the data to be output in the buffers 57, 58 and 59, and by switching between them in order to transfer data from the input buffers 57 and 58 to the hard disk 13, or to transfer data from the hard disk 13 to the buffer 59.

Although hard disks comprising separate heads for writing and reading are available, in the interest of cost, in this example, the hard disk 13 comprises one single head for both writing onto and reading from the hard disk 13. Therefore, while the hard disk 13 at any point in time stores/reads data associated with only one of the three data channels 54, 55 and 56, it sequentially stores/reads data associated with the three channels 54, 55 and 56, thereby "virtually" dealing with the three data channels 54, 55 and 56 simultaneously.

The switching is controlled by the processor 23 by arbitrating between any three of the buffers 57, 58 and 59 at a frequency which is in accordance with their buffer size so as to prevent a data overflow and thereby data loss. For example, if the buffers 57, 58 and 59 are capable of storing 8 megabytes of received data each, and the receiver 3 is operated to record two simultaneous television programmes received through the channels 54 and 55 at an average data rate of approximately 2 megabytes per second, then the hard disk 13 is operated to receive alternately data from the buffers 57 and 58 at an alternation cycle of 4 seconds or preferably less, transferring the buffer content to the hard disk 13 each time the processor switches from one of the buffers 57, 58 to the other. Accordingly, it is possible to record simultaneous/overlapping television programmes received by the first and second tuners 10a, 10b in different channels.

The buffering of incoming as well as outgoing data by the data buffers 57, 58 and 59 means that the hard disk 13 does not need to be synchronised to a particular input or output data rate. Instead, the hard disk 13 always reads and stores data at the same constant data rate. The amount of data stored on or read from the hard disk 13 is determined by the duration for which the hard disk 13 is switched for data transfer to the respective one of the data buffers 57, 58 or 59. During such time data is transferred from or to the respective data buffer 57, 58 or 59 at the constant data rate. While the reception data rate through the channels 54 and 55 or the output data rate through the channel 56 may vary (for example depending on the bandwidth of received television signals, or depending on the playback mode), the intermittent rate of data transfer between any of the buffers 57, 58 and 59 and the hard disk 13 is constant and determined by the data rate at which the hard disk 13 works.

The hard disk 13 is substantially the same as a hard disk from a conventional personal computer. As for computer data file systems, data is stored on the hard disk 13 in sectors, which might each store say 512 kilobytes of data and may or may not be contiguous on the hard disk 13. The processor 23 uses file system software to manage the storing of data on the hard disk 13 such that, regardless of how data is actually stored on the hard disk 13, it appears to be input and output as contiguous stream of data. More specifically, the processor 23 maintains a file allocation table. When data is to be written on the hard disk 13, the processor 23 allocates sectors of the hard disk 13 to a new file. The file allocation table effectively links sectors of the hard disk 13 together to form individual files as necessary, despite the individual sectors not necessarily being contiguous.

A time counter 23a for maintaining a record of the playback duration of the programme data recorded on the hard disk 13 is associated with the processor 23. The counter 23a is shown as a separate unit from the processor 23 to facilitate understanding. It will however be appreciated from the following that the counting function of the counter 23a may in practice be performed by registers within, or software running on, the processor 23.

In this example, there is a close correlation between the relative timing of different portions of the data received at the receiver 3 (the arrival time) and the relative timing of the portions when they are intended to be displayed (the presentation time). This correlation exists despite the fact that the rate at which data is transmitted (i.e. the amount of data transmitted during a period), and therefore received, varies depending on content because, regardless of content, it takes approximately one second to broadcast data for one second of a programme. The processor 23 and the counter 23a take advantage of this to 'count' time in the incoming programme data. In this example, the counter does not simply count time from the beginning of programme data to be stored in a file as this can be complex if old data at the beginning of the file is deleted. Instead, the counter counts an absolute time (GMT or UTC for example). The count data is appended to the programme data as it is written to the disk 13 in this example. In another example, the count data is written to a separate index register file on the disk 13, for example in the metadata area of the disk 13 mentioned above.

As programme data is received by the receiver 3, it can be written to a file on the hard disk 13. More specifically, the received programme data can be stored on the hard disk 13 as a linear file or in a so-called "review buffer". A linear file has a defined start and programme data is added to the file from the start until a defined end is reached. In contrast, the review buffer has a defined start, but once the file contains programme data of a specified duration, the processor 23 deletes the beginning of the file and continues to record received programme data in the file in new sectors of the hard disk 13. (In practice, the new sectors might include some or all of those sectors that contained the data deleted from the beginning of the file, but only if the processor happens to allocate those new sectors to the file. This is not the same as simply overwriting sectors already permanently allocated to the file.)

The count data is most useful for the review buffer. For example, the processor 23 can monitor the count data for the programme data as it is written to a file on the hard disk 13. When the processor determines that the programme data in the file has a specified duration, the processor 23 can delete the beginning of the file whilst new programme data is written at the end of the file such that the programme data stored in the file does not exceed the specified duration. More specifically, the processor 23 can move the start of the file. For example, the processor 23 can identify the sector in which the file starts and then locate a subsequent sector of the file from the file allocation table to which to move the start of the file, such that the sectors preceding the new start of the file are deleted from the file.

The count data can be used to control movement of the start of the file, i.e. to locate the subsequent sector to which to move the start of the file. When the count data is appended to the programme data as it is written to the data file, the processor 23 reads the count data from the file. When the count data indicates that (say) 30 seconds of programme data has elapsed from the start of the file, the start of the file is moved to the sector storing data including that point in the file. When the counter 23a and processor 23 subsequently indicate that (say) 30 seconds of new programme data has been written at the end of the file, the start of the file is then moved again and so on. If the count data is stored in the separate index register, the processor 23 operates in the same manner, except that data in the index register is read to identify a point in the file at which (say) 30 seconds of the programme has elapsed. In one example, the index register may store the number of bytes of data periodically received and the new start of the file can be identified by summing the number of bytes for the desired period (e.g. 30 seconds).

This method of storing data provides the receiver 3 with greater flexibility than has previously been possible. In particular, the receiver 3 can change from recording just the last 30 minutes (say) of the programme in a review buffer, to recording the programme in its entirety in a linear file straightforwardly, as long as the viewer selects 'record' for the programme within 30 minutes (say) from the start of the programme. This is achieved by stopping moving the start of the review buffer. As soon as this is done, the review buffer is effectively converted to a linear file. A new review buffer can then be straightforwardly created by starting a new file if desired.

Figure 3:
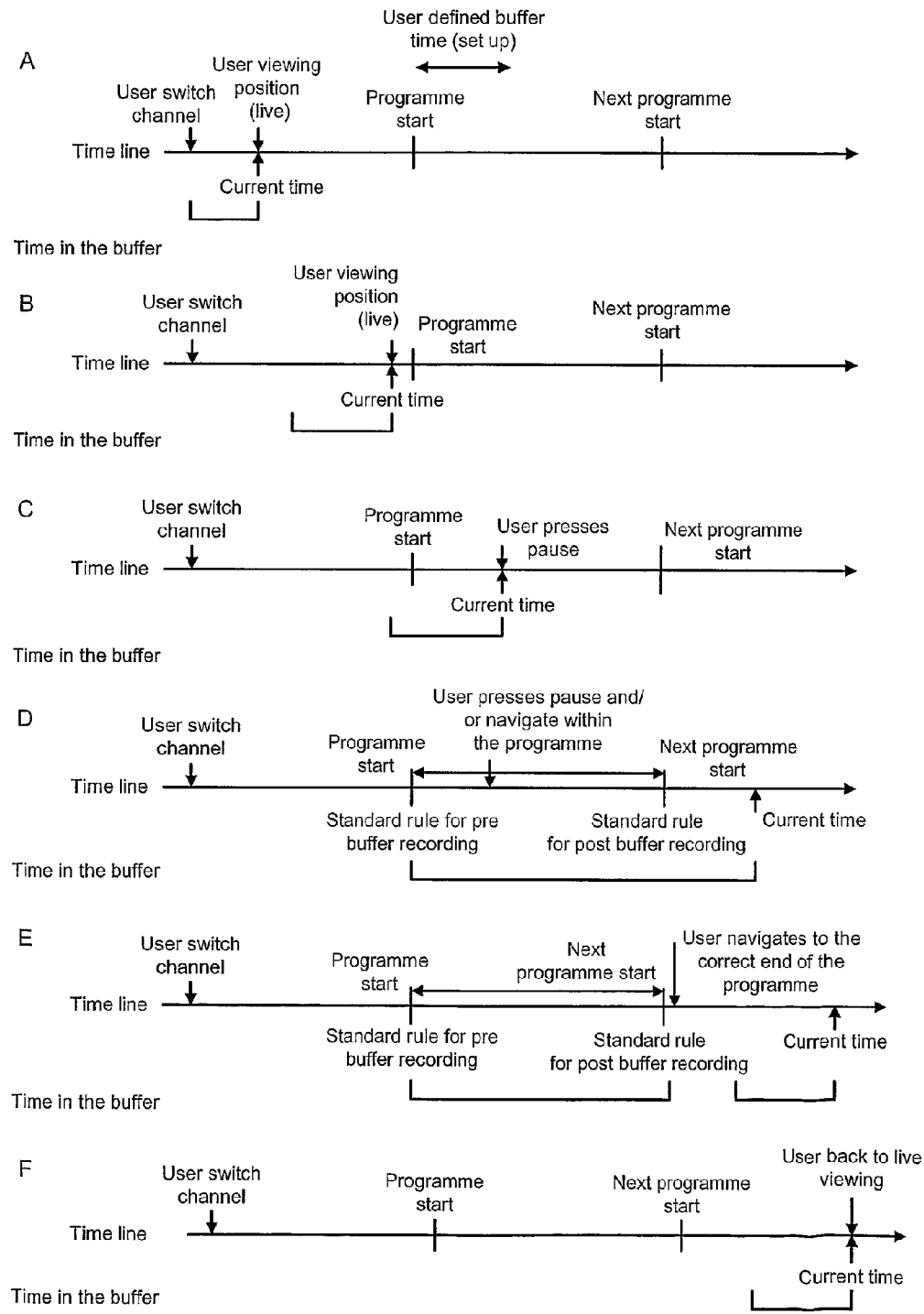
FIG. 3 is a schematic representation of a first recording timeline.

FIG. 3 of the accompanying drawings illustrates one way in which the hard disk 13 is controlled to store data during the recording of a programme. The hard disk 13 is arranged to record by default the programme currently being viewed by the viewer in a file on the hard disk 13. This file is referred to as a "review buffer" as mentioned above. Under this default condition, which is depicted by time line A in FIG. 3, the hard disk 13 will store up to 30 minutes (say) of the current programme. Typically, this length of time is preset as a default time of 30 minutes during manufacture or configuration of the receiver 3, but it may be user selected to be 0 minutes (i.e. turned off), 5 minutes, 15 minutes, 30 minutes or 1 hour for example. Generally, any period up to an hour could be chosen by a user. The recording begins when the user switches on the receiver 3 or when he switches to a new channel Recording continues until the designated period of time has been recorded and thereafter continues with the oldest or earliest parts of the recording being deleted such that only the selected length of the programme is retained. This default recording operation is a background operation and requires no user interaction. Time line B shows progression of the recording shown in time line A during the broadcast of a programme. In time line B, the length of the current programme stored in the review buffer is at its maximum and does not include all of the programme from the time when the user switched on the receiver 3 or switched channels. The same time line is also shown as time line C of FIG. 3 at a later time when the review buffer includes the end of the previous current programme and the beginning of a succeeding programme, i.e. extends on both sides of a programme start.

In the event that the user presses a "pause" button on the receiver 3 or the remote control unit 28 during normal viewing of a broadcast programme, the receiver 3 enters a "live pause" mode. In this mode a paused frame of video is displayed on the TV 2, but the programme continues to be recorded. More specifically, if, as shown in time line C, the review buffer includes the start of a programme when the live pause mode is entered, the content of the review buffer is truncated to the start time of the current programme as shown in time line D. In other words, all data stored in the review buffer that is older than the start of the current programme is deleted. If the start time is not included in the review buffer when the live pause mode is entered, the entire programme recorded so far, i.e. all the data in the review buffer, is retained. Thereafter, as shown in time line D, recording continues with all data being held in the file. More specifically, the review buffer is converted to a linear file by the deletion of data from the file being suspended. At the programme boundary, e.g. when the start of the next programme is received, the recordal of data in the linear file is stopped and the next programme starts to be recorded in a new review buffer, as shown in time lines D, E and F. The linear file therefore includes the recorded programme, either in its entirety, or from the (say) 30 minutes (or whatever period is set by the user) from before the instant when the pause button was pressed until the end of the programme. The new review buffer contains the succeeding programme from the start.

In time line D, the viewer has commenced navigation within the recorded file by pressing the "play" button or the "fast forward" button on remote control 28 and the receiver 3 is displaying the programme stored in the linear file. At the point shown in time line E, the receiver 3 has reached the end of the programme stored in the linear file. In the meantime, the new review buffer has recorded the next succeeding programme for the default or selected period of time and is continuing to record the programme by deleting the earliest part of the recorded programme from the buffer. As the viewer cannot therefore view the start of the next succeeding programme (as it has already been deleted from the new review buffer), the receiver 3 returns the viewed to normal viewing by displaying the live broadcast as illustrated in time line F. The receiver is therefore effectively in the same state as in time line B, but with the viewer watching, and the review buffer recording, a later broadcast programme.

Figure 4:
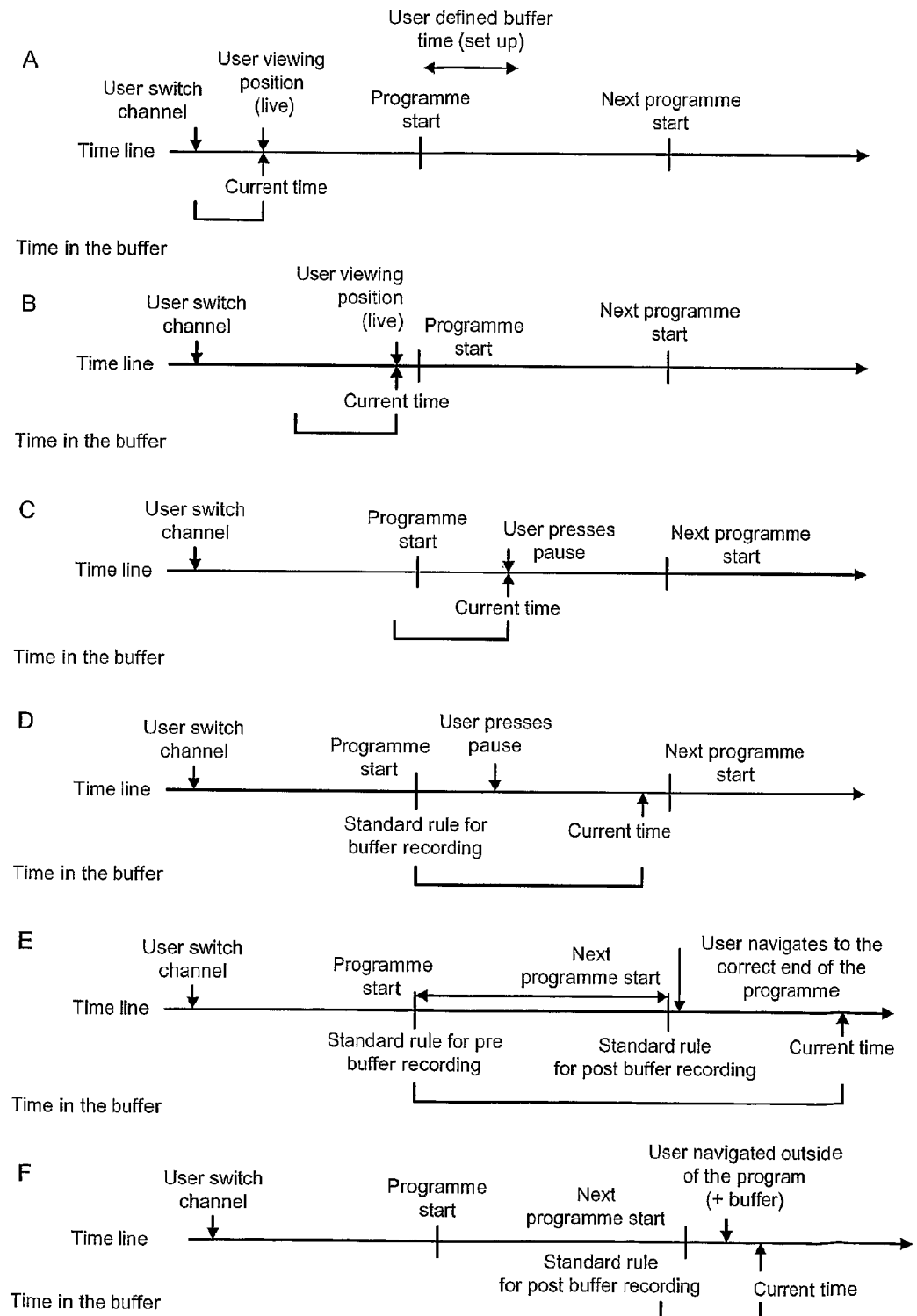
FIG. 4 is a schematic representation of a second recording timeline.

Time lines A, B and C of FIG. 4 are identical to time lines A, B and C of FIG. 3. Time line D of FIG. 4 illustrates recordal of the current programme in live pause mode before the next succeeding programme starts to be recorded in a new review buffer. In time line E of FIG. 4, the viewer has pressed the "fast forward" button on the remote control 28 and the receiver 3 is displaying the programme recorded in the linear file at an increased rate. In time line F of FIG. 4, the receiver 3 has displayed all of the programme recorded in the linear file and, in this example, is displaying the next succeeding programme as recorded in the new review buffer. As can be seen from time lines E and F, the new review buffer has not reached its maximum capacity and still contains the start of the next programme when all of the programme stored in the linear file has been displayed. The receiver 3 can therefore seamlessly catch up with the live broadcast by displaying the contents of the linear file and the new review buffer at an increased rate. In another example, even when the review buffer includes the start of the next programme, the viewer is returned to, i.e. the receiver 3 displays, the live broadcast. Typically, the user is given a choice between these two examples, e.g. by display of an appropriate message.

In the above example, the live pause mode causes the entire review buffer (subject to truncation) to be retained (as linear file) until the recorded programme has been viewed to the end. Thus, the viewer can rewind to beginning of the programme or to the length of the review buffer before live pause mode was entered at any time until entire programme has been viewed. In another example, as soon as the viewer starts to view the recorded programme, e.g. by pressing the "play" or "fast forward" buttons on the remote control 28, deletion of the start of the file recommences. More specifically, programme data before the default time of (say) 30 minutes or the selected time mentioned above from the point in the recorded programme being viewed is deleted from the file. (In the event that the selected time is 0 minutes, programme data before 5 minutes from the point in the recorded programme being viewed is deleted from the file.) Memory space is therefore made freely available more quickly than in the previous example.

Figure 5:
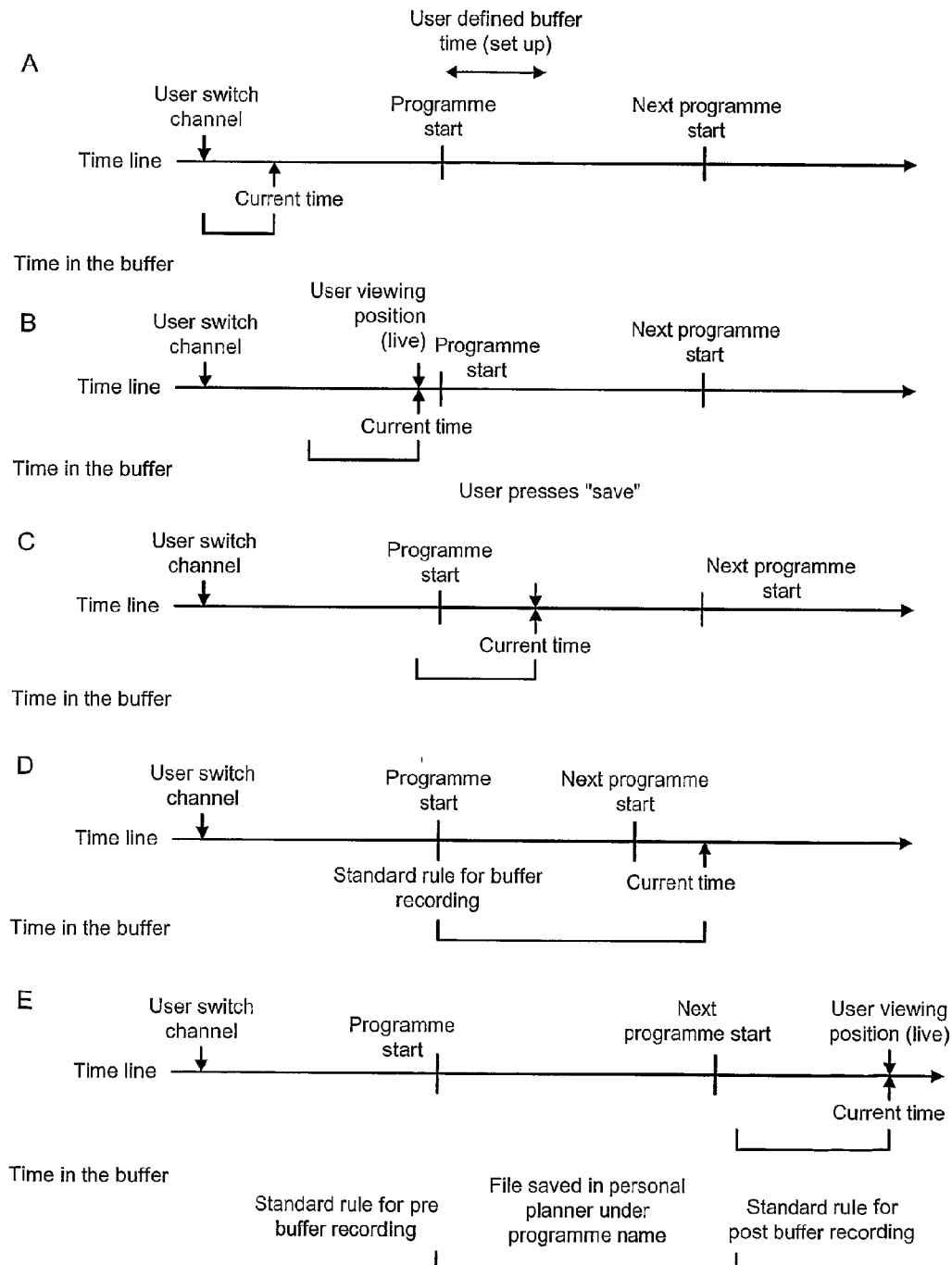
FIG. 5 is a schematic representation of a third recording timeline.

Time lines A and B of FIG. 5 are the same as time lines A and B of FIG. 3. However, in time line C of FIG. 5, the viewer presses a save button on the remote control 28 instead of the pause button as in time line C of FIG. 3. Whilst the receiver therefore truncates the review buffer to the start of the programme being recorded in the review buffer and converts the review buffer to a linear file as in time line D of FIG. 3, in time lines D and E of FIG. 5, the receiver 3 saves the linear file. In particular, the title of the recorded programme is added to the user's personal planner. The saving is actually carried out at the end of the recorded programme. In addition, if the user changes channel after pressing the save button, the receiver continues to record the programme and the programme received in the new channel is recorded in a new review buffer.

Figure 6:
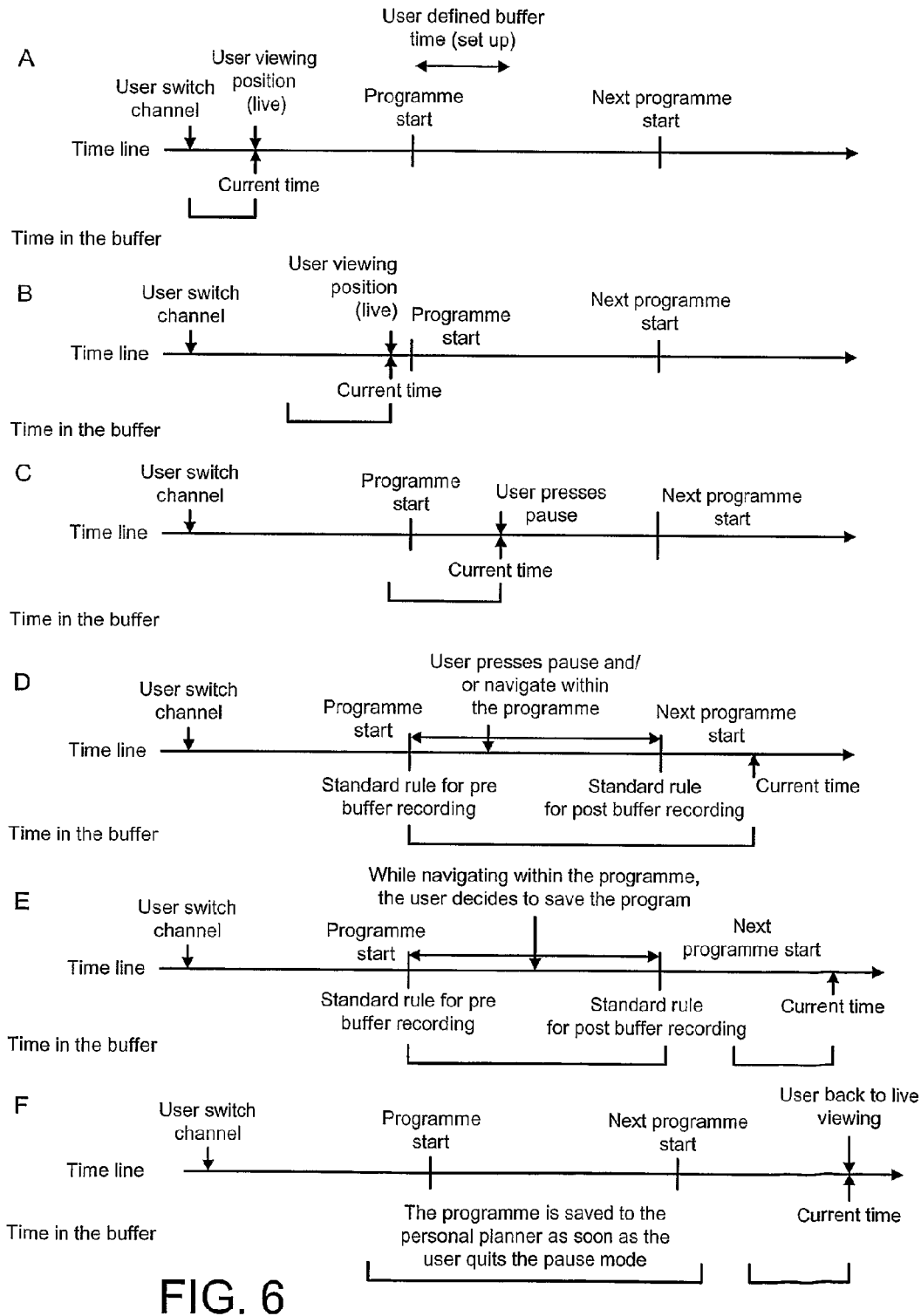
FIG. 6 is a schematic representation of a fourth recording timeline.

Time lines A to D of FIG. 6 are the same as time lines A to D of FIG. 3. However, in time line E, whilst the viewer is fast forwarding through the stored programme, the viewer decides to save the programme and presses the save key on the remote control 28. The receiver 3 therefore saves the linear file at the end of the programme by adding the programme name to the viewer's personal planner and returns the viewer to the live broadcast in a similar manner to time lines E and F of FIG. 3.

The receiver 3 is able to record one programme, while another programme is being both viewed and recorded. The receiver also automatically records programmes in a review buffer or in a linear file without specific input from a user. This greater flexibility and automation in recording brings with it the possibility of conflict between demands for memory space of the hard disk 13. For example, allowing two programmes to be recorded simultaneously increases the likelihood of a conflict occurring between programmes selected to be recorded and programmes already recorded. In order to deal with this problem, the receiver 13 includes a priority table, that may be user defined, but is normally defined on configuration of the receiver 13.

One way in which existing recordings can be prioritised is to allow the viewer to select recordings that should never be automatically deleted ("keep events") and to make decisions based on that selection. Keep events take priority over any other recording and, if the hard disk is already full of keep events, other recordings including automatic recordings in the review buffer are abandoned in order to preserve the keep events. The next highest priority is given to pay-per-view (PPV) programmes. These programmes are paid for and the viewer would therefore be unhappy if a PPV recording was erased before being viewed. Next is other recorded but not yet viewed programmes, followed by recordings already viewed and recordings made while a programme was being viewed (e.g. the review buffer). Part-recorded programmes have lower priority than full recordings. Thus, if there is a disk space conflict, the first recordings to be deleted are the recordings made while a programme was being viewed followed by recordings that have already been viewed, then other recorded programmes and so on up to PPV programmes. Keep events are not usually automatically deleted.

Conflicts can also occur between programmes identified for recording. These conflicts can be dealt with in a similar manner by prioritising the programmes to be recorded. In this example, the highest priority is given to keep events, then PPV programmes, then scheduled programmes that are series linked (e.g. an ongoing soap opera or series) and then other scheduled programmes. The review buffer has lowest priority since it is a record of what the viewer has just seen. If two programmes were to fall into the same priority group or category then the shorter programme is recorded in favour of the longer programme in the absence of any other input from the viewer.

The receiver 3 may include the facility for extra-time recording in which a recording begins early or ends late in order to accommodate slight slippage in the broadcasting schedule. This extra time recording can cause conflicts with a start time for one programme being earlier than a finish time for another programme. In this example, this conflict is dealt with by providing the end of one programme with priority over the start of another and by giving a real end time priority over an extended end time.

This automatic prioritising of recordings need only be applied in the absence of further input from the viewer. Conflicts can develop after the receiver 3 has been programmed because of a slip or other change in the scheduled broadcast time of thee programme. In the event that a conflict develops, the receiver 3 is arranged to display a warning when the viewer turns on the receiver 3, inviting the viewer to adjust the programmed recordings. If the viewer does not turn on the receiver 3 before the conflicting programmes are broadcast, then the prioritising rules will be applied. Conflicts can, of course, also occur when the viewer is programming the receiver 3 to record programmes.

Figure 7:
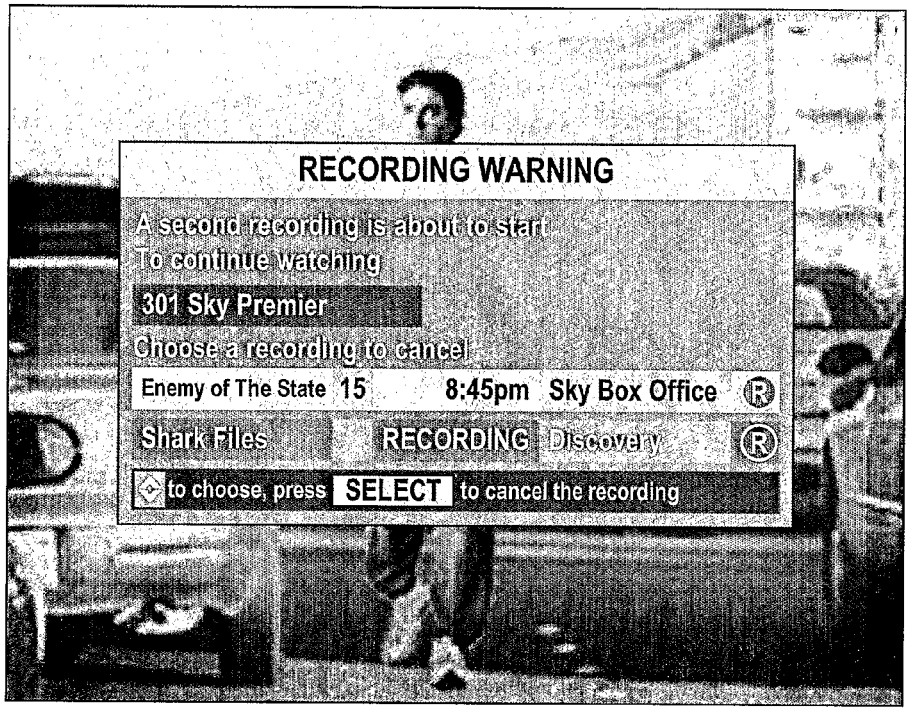
FIG. 7 is a schematic representation of a first conflict screen.

In either case, the receiver 3 will output display screens identifying the conflict and suggesting changes to the programmed recording in order to resolve the conflict. The suggested changes are made based on the defined priority rules. An example of a warning display screen is shown in FIG. 7 of the drawings. Here the viewer is watching channel 310 Sky Premier and the receiver is programmed to record both Enemy of the State and Shark Files. There are only two tuners 10a, 10b and so one of the recordings will have to be sacrificed if the viewer is to continue watching channel 310 Sky Premier. The viewer can interact with the display screen to cancel the recording of either Enemy of the State or Shark Files, or can leave the programming as is, to end his viewing of channel 310 Sky Premier.

Figure 8:
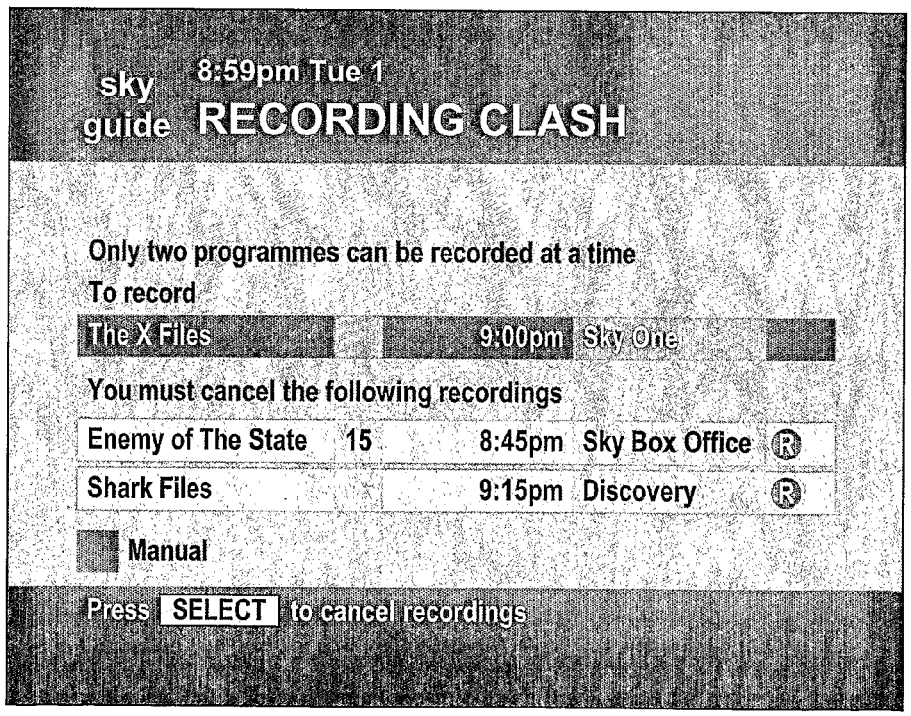
FIG. 8 is a schematic representation of a second conflict screen.

An example of a recording clash warning screen is shown in FIG. 8 of the drawings. Here the viewer has previously programmed the receiver to record Enemy of the State and Shark Files at times that overlap. The viewer has then attempted to record The X Files at a time that conflicts with the broadcast (and recording) time of the other two programmes. A message, similar to that displayed on the screen of FIG. 7, is displayed advising the viewer on how to resolve the conflict.

Figure 9:
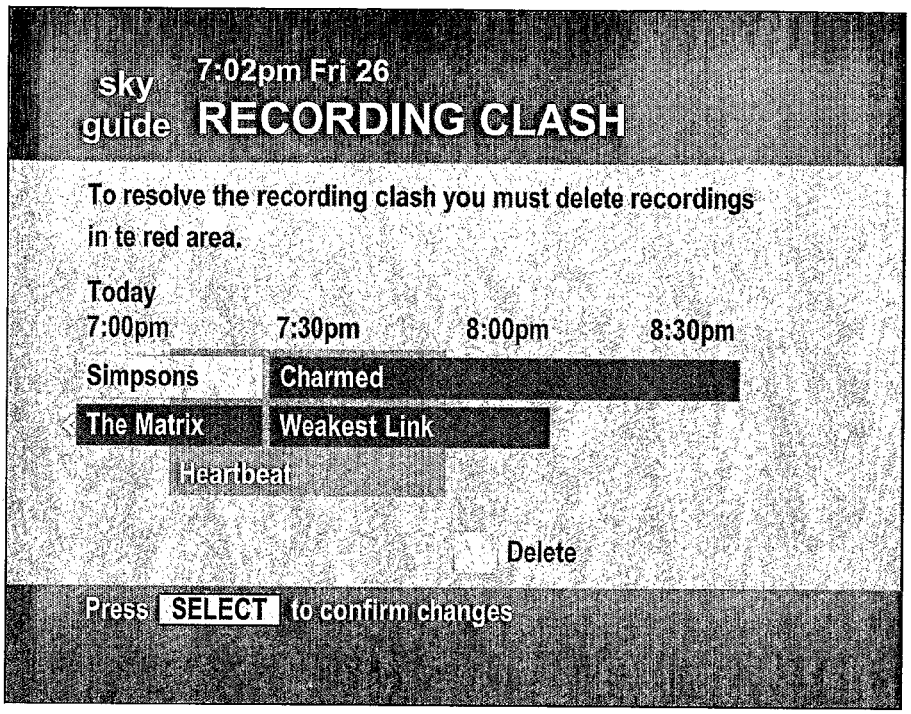
FIG. 9 is a schematic representation of a third conflict screen.
Figure 10:
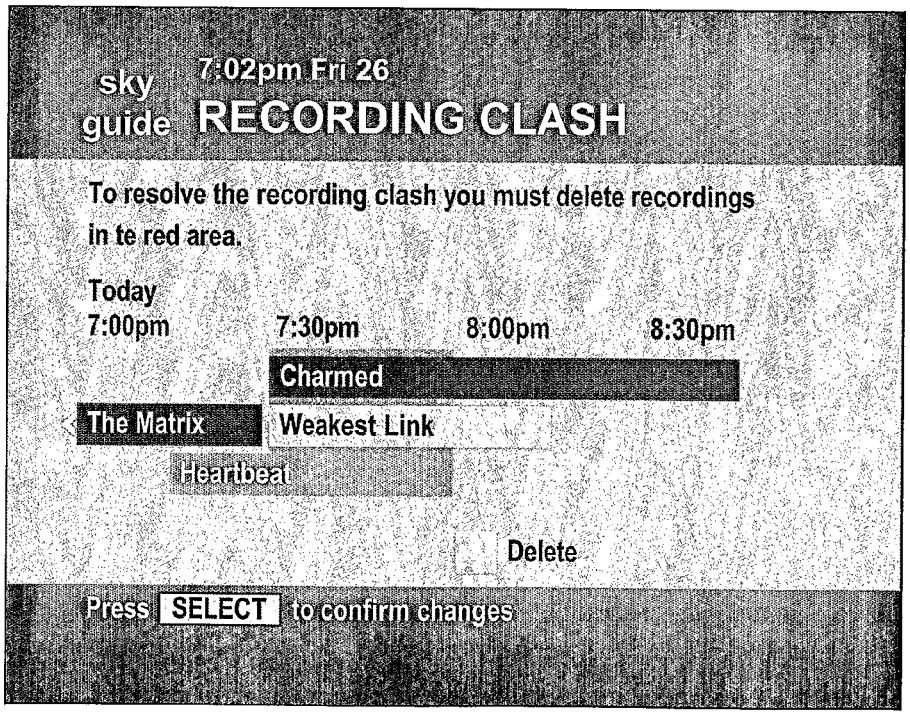
FIG. 10 is a schematic representation of a fourth conflict screen.
Figure 11:
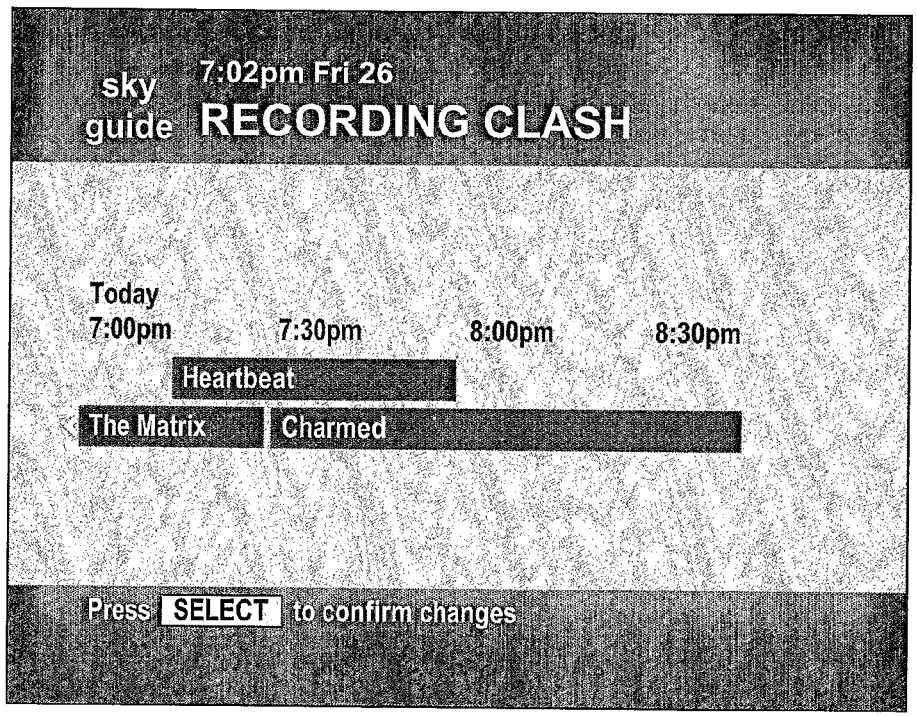
FIG. 11 is a schematic representation of a fifth conflict screen.

Another example of a recording clash warning screen is shown in FIG. 9 of the drawings. Here the receiver 3 has been programmed to record Simpsons and Charmed through one receiver 10*a* and The Matrix and Weakest Link through the other receiver 10*b*. Simpsons and The Matrix both end at 7.30 pm, and Charmed and Weakest Link both start at 7.30 pm. When Heartbeat is added to the recording schedule a conflict occurs. The receiver 3 generates the display screen as shown, identifying the conflict with a highlight 300 and suggesting changes by highlighting a programme 302 (in this case Simpsons) that should be deleted. Viewer interaction will result in the screen being changed to that shown in FIG. 10, in which programme 302 is no longer shown and programme 304 (Weakest Link) is highlighted as the suggested deletion. Further interaction will result in the screen shown in FIG. 11 being displayed, in which Heartbeat is programmed to be recorded via one receiver 10*a*, and The Matrix and Charmed are programmed to be recorded via the other receiver 10*b*. Other screens are of course possible depending on the number of tuners 10*a*, 10*b*, the priority rules and other features of the system.

Modifications and variations such as will occur to those possessed of appropriate knowledge and skills may be made to the above examples without departure from the spirit and scope of the invention as set out in the appended claims and equivalents thereof.

The invention claimed is:

1. A method of recording television programmes comprising:
   receiving programme schedule data;
   buffering a television signal currently being displayed on a television screen; and
   responding to a request, issued by a user after the buffering has started, to record a television programme included in the television signal by saving the buffered television signal along with subsequent television signals to record the programme, performing an identification using the received programme schedule data to identify a start of the television programme included in the buffered television signal and truncating the saved buffered television signal based upon said identification, wherein all data in the saved buffered television signal that is older than the start of the television programme is deleted.

2. The method of claim 1, wherein the request to record the television programme comprises pausing display of the television programme.

3. The method of claim 1, wherein the request to record the television programme comprises display of the buffered television signal.

4. An apparatus for recording television programmes comprising:
   a memory for buffering a television signal currently being displayed on a television screen; and
   a processor for responding to a request, issued by a user after the buffering has started, to record a television programme included in the television signal by saving the buffered television signal along with subsequent television signals to record the programme, wherein
   the apparatus is arranged to receive programme schedule data and to perform an identification using the programme schedule data to identify a start of the television programme included in the buffered television signal; and the processor truncates the saved buffered television signal based upon said identification, wherein all data in the saved buffered television signal that is older than the start of the television programme is deleted.

5. The apparatus of claim 4, wherein the request to record the television programme comprises pausing display of the television programme.

6. The apparatus of claim 4, wherein the request to record the television programme comprises display of the buffered television signal.

7. A television signal receiver including the apparatus of claim 4.

* * * * *